Sept. 19, 1961  H. W. SIMPSON  3,000,235
PLANETARY TRANSMISSION
Filed Feb. 13, 1956
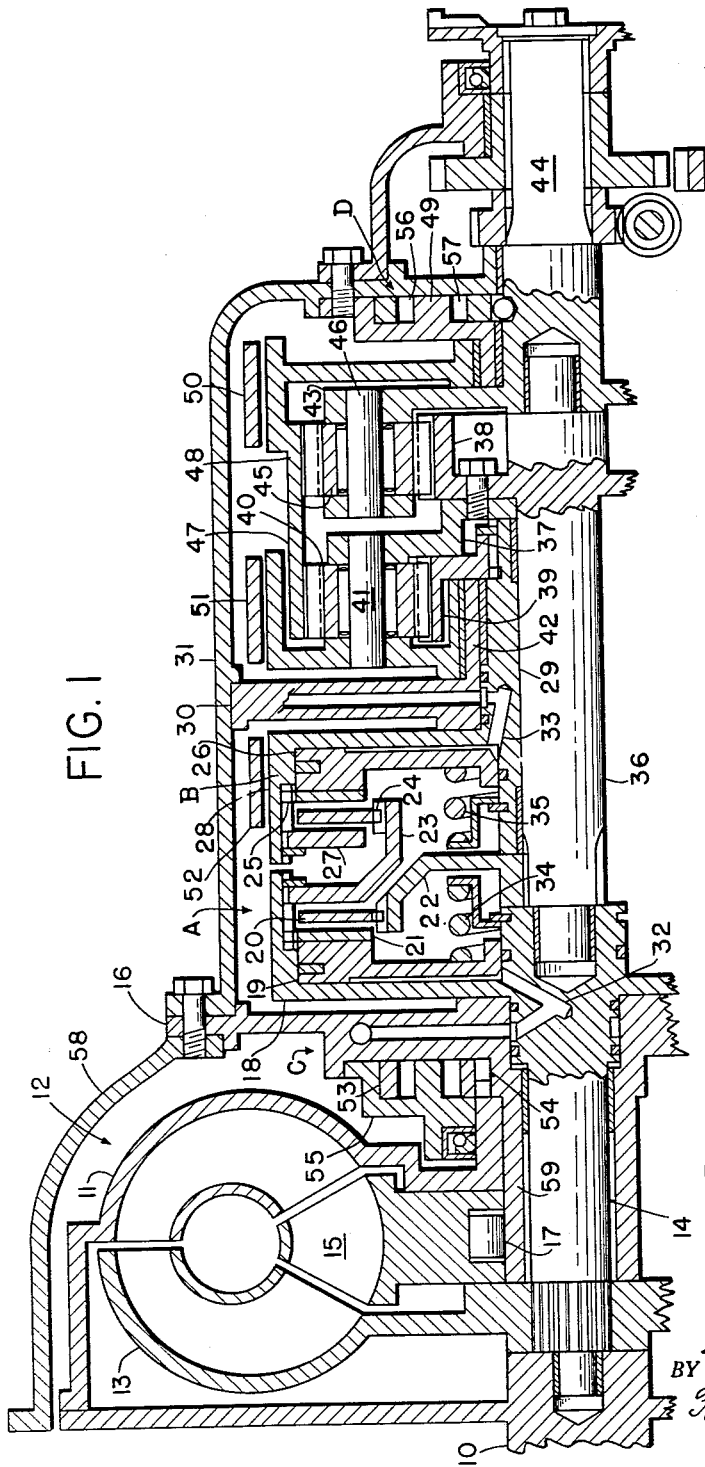
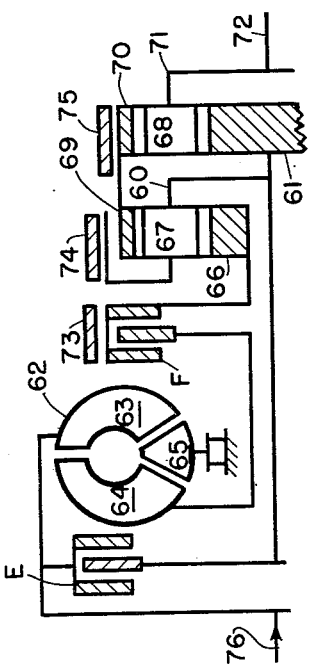
INVENTOR.
Howard W. Simpson
BY
Farley Forster & Farley
ATTORNEYS.

United States Patent Office 3,000,235
Patented Sept. 19, 1961

3,000,235
PLANETARY TRANSMISSION
Howard W. Simpson, 730 Crescent Drive,
Dearborn, Mich.
Filed Feb. 13, 1956, Ser. No. 564,923
14 Claims. (Cl. 74—759)

This invention relates to a multi-speed planetary transmission for an automotive vehicle. More particularly, this invention provides a transmission adapted for trucks and tractors, in which four speeds forward and one reverse speed are obtained by the use of two simple planetary gear trains coupled in various ways.

Such vehicles require a broad range of gear ratios, between a low ratio and a high gear ratio, but this is not obtainable in the conventional gear train. The combination set forth herewith provides a top speed which is an overdrive and a low speed which is a compound reduction drive ratio so that a wide range or spread of ratios is available for use.

The main object of this disclosure is therefore to provide a transmission wherein a wide range of ratios is available, including a double or compound gear reduction drive in low speed ratio and an overdrive ratio in high speed ratio.

Another object is to provide a transmission having an efficient overdrive gear in top speed.

Another object is to provide a transmission control mechanism for a four speed and reverse transmission having a fluid torque converter fully effective in low and reverse speed ratios, the converter being partially or completely by-passed and ineffective to a corresponding degree in second, third and fourth speeds.

These and other features of the invention will be more apparent from the following detailed description of a preferred embodiment of my invention and from an examination of the drawings disclosing such embodiment wherein:

FIGURE 1 is a longitudinal view in partial section of one embodiment of the invention in which a torque converter functions in all speeds; and FIGURE 2 is another embodiment which is similar except that in third speed the converter hydraulically transmits only partial torque and in second and fourth speeds the converter transmits no torque hydraulically.

In FIGURE 1 an input shaft 10 is connected to a pump 11 of a converter 12 enclosed in a houseing 58 which drives a turbine 13 splined to a converter output shaft 14. Stator 15 turns forwardly on a hub 59 of a housing plate 16 but is prevented from turning backward by a one-way clutch 17. The transmission clutch A includes a housing 18 integral with the shaft 14, a piston 19, friction plates 20 and 21, a driven hub 22, and a pressure plate 23. The latter is splined to the housing 18 to receive input torque to drive a second clutch B through splines meshing with a plate 24. Other members of the clutch B are a friction plate 25, a piston 26, a pressure plate 27 and a housing 28 which is supported in the hub 42 of a divider plate 30 which is attached to the main transmission housing 31. The clutch plates 21 and 25 are splined to slide axially when the respective pistons 19 and 26 are energized by oil through passages 32 and 33. Springs 34 and 35 return the pistons 19 and 26, respectively, when the oil pressure is released.

Hub 22 of clutch A drives an intermediate shaft 36 which turns freely in the hub 29 and drives a carrier 37 and a sun gear 38 respectively secured to the shaft 36. The sleeve on hub 29 is splined to a second sun gear 39 which it drives at input speed when clutch B is engaged. The sun gear 39 meshes with a plurality of planets, one of which, indicated at 40, is shown mounted on a pin 41. A carrier 37 is rotatably supported on a hub 42 of the plate 30. A second carrier 43 is integral with the output shaft 44 and supports a plurality of additional planet gears, one of which, indicated at 45, is shown supported on a pin 46. Integral ring gears 47 and 48 are supported on a pump housing 49 and can be held by a brake band 50. Another brake band 51 is adapted to hold the carrier 37 and sun gear 38 and a third brake band 52 is adapted to hold the clutch housing 28 and the sun gear 39 against rotation. Pressure to operates the clutches and brakes is obtained from pumps C and D which are driven by converter pump 11 and output shaft 44, respectively. Pump C comprises an internal gear 53, and an external gear 54 in housing 55. Pump D comprises a housing 49 and gears 56 and 57.

In the embodiment of FIGURE 2, an input shaft 76 and a clutch E drive both a carrier 60 and a sun gear 61 at input speed when clutch E is engaged. Converter 62, consisting of a pump 63, a turbine 64 and a stator 65, drives clutch F which, when engaged, drives a second sun gear 66. The planet gears 67 and 68 mesh with the sun gears 66 and 61 and integral ring gears 69 and 70, respectively. Carrier 71 is connected to the output shaft 72. Brake bands 73, 74 and 75 are adapted to hold sun gear 66, carrier 60 and sun gear 61, and ring gears 69 and 70, respectively.

*Operation FIGURE 1*

In neutral all clutches and brake bands are released. In low, clutch B is engaged and band 50 is applied. A reduction drive is obtained in the left hand planetary set, wherein the sun gear 39 is driven through clutch B, with ring gear 47 functioning as the reaction member and carrier 37 as the output member, driving the sun gear 38 which is the input member of the right hand gear set. With the ring gear 48 held by band 50 to serve as the reaction member and the carrier 43 the output member, a further reduction is obtained, thus driving the output shaft 44 in low gear. Low gear is thus a compound or double reduction gear drive.

In second speed, the brake band 50 remains applied but the clutch B is released and clutch A is engaged to drive the sun gear 38 at the speed of the input shaft 14 and carrier 43 is driven at a reduced output speed but faster than in low speed because second is a single reduction gear drive, since no effective drive is obtained through the left hand gear set.

Third speed is a direct drive with both the clutches A and B engaged to drive both sun gears 38 and 39 and the carrier 37 at input shaft speed.

Fourth speed is an overdrive with clutch A engaged and brake band 52 holding the sun gear 39 as a reaction member. Carrier 37 and sun gear 38 are now both input members and a differential compound gear drive through both gear sets is obtained with carrier 43 being driven at overdrive speed greater than input speed.

In reverse drive, the clutch B is engaged, thus driving the sun gear 39 at input speed as in low gear. But with carrier 37 held by brake band 51, ring gears 47 and 48 turn backward. Since sun gear 38 is also held by brake bank 51 it is also a reaction member, so that the right hand gear set acts as a further reduction gear set between the ring gear 48 and the carrier 43 to slow down the reverse speed.

Thus low and reverse are both double reduction or compound gear ratios, second is a single reduction gear ratio, third is a direct drive ratio and overdrive is a differential gear ratio with part of the input torque transmitted from the carrier 37 through to planet gears 40 to the ring gear 47 and then from the ring gear 48 to the carrier 43 and the output shaft 44. The remaining input torque is transmitted from the sun gear 38 through the planet gears 45 to the carrier 43.

Operation FIGURE 2

In low and reverse drives, the operation is the same as in FIGURE 1, i.e. all of the input torque is transmitted through the converter 62 with clutch F engaged. Sun gear 66 is the input gear and carrier 71 the output member. Low is a double reduction or compound gear ratio with brake band 75 applied and reverse is also a double reduction or compound gear ratio with brake band 74 applied.

In second gear ratio, clutch E and brake band 75 are engaged to provide a by-pass drive from the engine shaft 76 to sun gear 61 independent of the converter and thus no fluid slip losses are present.

In direct drive clutches E and F are both engaged which brings the converter 62 back into operation under partial torque load. Input shaft 76 transmits torque through clutch E directly to sun gear 61 and carrier 60. Part of the torque of carrier 60 is transmitted back through sun gear 66, clutch F, and converter 62 to clutch E and the remainder of the torque is transmitted from carrier 60 to output shaft 72 through ring gears 69 and 70 and carrier 71, where it is joined by the torque from sun gear 61.

In fourth speed clutch E remains engaged but clutch F is released and brake band 73 is applied to hold sun gear 66 as a reaction member. At this time a split drive is obtained with a part of the input torque being transmitted to carrier 71 by the input sun gear 61 through planet gears 68 and the remainder of the torque being transmitted by carrier 60 through planet gears 67 and ring gears 69 and 70. No torque, except possibly a slight drag, is transmitted by the converter in second and fourth speeds and only fractional torque in third speed. In third speed, due to torque feed back from sun gear 66 through clutch F and converter 62 to clutch E as described above, clutch E is subjected to a fraction more than input torque. Clutch E does not have to be engaged under this higher torque loads since clutch E has already been engaged in second speed, if upshifting or in fourth speed, if downshifting.

Clutch E can therefore carry more torque in third speed without danger of slip because the already engaged clutch will operate at its higher static co-efficient of friction, thus giving clutch E more capacity than that which it would have if forced to engage under such slipping conditions.

In fourth or overdrive speed it is obvious that if sun gear 66 is held by brake 73, carrier 60 will cause the ring gears 69 and 70 to overdrive. The differential action of ring gear 70 turning at overdrive speed and sun gear 61 turning at input speed causes carrier 71 to turn at overdrive speed but more slowly than ring gear 70.

While preferred embodiments have been described above in detail, it will be understood that numerous modifications might be resorted to without departing from the scope of my invention as defined in the following claims.

I claim:

1. In a variable speed transmission, input and output shafts, two planetary gear sets, each set comprising sun, ring and planet gears and a carrier for supporting the planet gears; first clutch means for connecting the input shaft to the carrier of one gear set and the sun gear of the other gear set, second clutch means for connecting the input shaft to the sun gear of said one gear set, means connecting the ring gears of both sets for co-rotation, and a connection between the carrier of the other gear set and the output shaft whereby, when both clutch means are engaged, a drive is obtained through the transmission.

2. In the combination set forth in claim 1, brake means for holding the sun gear of the one gear set, brake means for holding the carrier of the one gear set and the sun gear of the other gear set, and brake means for holding both ring gears, said clutch and brake means being selectively engageable for obtaining four forward and one reverse speed at the output shaft.

3. In the combination set forth in claim 1, brake means for holding the sun gear of the first gear set to obtain an overdrive speed when the first clutch means is engaged, brake means for holding the carrier of the one gear set and the sun gear of the other gear set for obtaining a reverse speed when the second clutch means is engaged, brake means for holding both ring gears for obtaining a gear reduction drive in only one gear set when the first clutch means is engaged and a compound gear reduction drive in both gear sets when the second clutch means is engaged.

4. In a variable speed transmission, input and output shafts, first and second planetary gear sets, each set comprising sun, ring and planet gears and a planet carrier, first clutch means for connecting the input shaft to the carrier of said first gear set and the sun gear of the second gear set, second clutch means for connecting the input shaft to the sun gear of said first gear set, means for connecting the ring gears of both sets for co-rotation, means for connecting the carrier of the second gear set to the output shaft, first brake means for holding one member of each gear set as a reaction member, second brake means for holding a different member of each gear set as a reaction member, and third brake means for holding still another member of the first gear set as a reaction member, said clutch and brake means being selectively engageable for obtaining four forward and one reverse speed at the output shaft.

5. In a variable speed transmission, input and output shafts; a pair of planetary gear sets, each including sun, ring, and planet gears and a planet carrier; first and second clutch means for transmitting drive from the input shaft firstly to the sun gear of one gear set and secondly to the carrier of the one gear set and the sun gear of the other gear set; means for connecting the carrier of said other gear set to the output shaft; first brake means for holding the ring gears of said sets stationary to provide two different reduction drive ratios dependent upon the clutch means utilized therewith; and a second brake means utilized in conjunction with the clutch means for said carrier of said one gear set and said sun gear of said other gear set to provide an overdrive ratio at which said output shaft is driven at a speed greater than the speed of the input shaft.

6. In a variable speed transmission, input and output shafts; a pair of planetary gear sets, each including sun, ring, and planet gears and a planet carrier; and means providing an overdrive gear ratio, comprising means for connecting the carrier of one gear set and the sun gear of the other gear set to the input shaft, means for preventing rotation of the sun gear of the one gear set, means for interconnecting the ring gears of said gear sets for co-rotation, and means for connecting the carrier of the other gear set to the output shaft.

7. In a variable speed transmission, input and output shafts; a first sun gear, a first ring gear, a first planet carrier, and a plurality of first planet gears comprising a first gear set; a second sun gear, a second ring gear, a second planet carrier, and a plurality of second planet gears comprising a second gear set; and means cooperable with said gear sets to provide a plurality of forward drive gear ratios between said input shaft and said output shaft, said gear ratios ranging from a compound low ratio at which the first sun gear is driven by means connected to the input shaft, the second carrier is connected to the output shaft, the first carrier and second sun gear are interconnected, and both ring gears are held stationary; to an overdrive ratio at which the first sun is held stationary, the first carrier and the second sun are driven by means connected to the input shaft, the second carrier is connected to the output shaft, and the ring gears are interconnected.

8. In a variable speed transmission, input and output shafts; a pair of planetary gear sets, each including sun, ring, and planet gears and a planet carrier; the ring gears being interconnected and the carrier of one gear set being connected to the output shaft; means for driving the carrier of the other gear set and the sun gear of the one gear set from the input shaft; means for driving the sun gear of the other gear set from the input shaft, thereby establishing a drive through the transmission, said last means being releasable; and means for holding said sun gear of said other gear set against rotation, thereby establishing overdrive in said transmission.

9. In a variable speed transmisison, input and output shafts; a planetary gear mechanism having co-rotatable ring gears, a first carrier co-rotatable with a first sun gear, a second sun gear meshing with planet gears supported by said first carrier, and a second carrier co-rotatable with said output shaft and supporting planet gears meshing with said first sun gear; and means for establishing a plurality of forward speed drives, comprising first clutch means for transmitting drive to said second sun gear from the input shaft, second clutch means for transmitting drive to said first carrier and said first sun gear from the input shaft, and brake means for holding said ring gears against rotation, a compound reduction ratio being established through operation of said first clutch means and said brake means, a simple reduction ratio being established through operation of said second clutch means and said brake means, and a direct drive ratio being established through operation of said first and second clutch means.

10. In a variable speed transmission, input and output shafts; a torque converter having an input element connected to the input shaft and an output element; a pair of planetary gear sets, each having sun, ring, and planet gears and a planet carrier; the ring gears being co-rotatable, the carrier of one gear set and the sun gear of the other gear set being co-rotatable, the carrier of the other gear set being connected to the output shaft; and means for establishing a pair of stepped forward gear ratio drives in said gear sets comprising means holding said ring gears as reaction members, a first clutch for interconnecting the output element of the torque converter with the sun gear of the one gear set, and a second clutch for interconnecting the input shaft with the carrier of the one gear set and the sun gear of the second gear set, whereby said first clutch is effective to establish a compound reduction gear ratio in said gear sets and utilizing any torque multiplication in said converter, and said second clutch is effective to establish a simple reduction gear ration in one of said gear sets independently of said converter.

11. In a variable speed transmisison, input and output shafts, a torque converter having an input element connected to the input shaft and an output element; first and second sun gears, first and second carriers each supporting a set of planet gears meshing with said first and second sun gears, respectively, and co-rotatable ring gears meshing with the sets of planet gears, respectively; means for connecting said first carrier with the output shaft; a first clutch for connecting said first sun gear with said input shaft; a second clutch for connecting said second sun gear with said converter output member; and means interconnecting said first sun gear with said second carrier; whereby the input torque is split between said first and second clutches to obtain a differential drive at said sun gears.

12. In a variable speed transmission as defined in claim 11, a brake for said ring gears operable in combination with said second clutch only to provide a compound reduction first speed drive and operable in combination with said first clutch only to provide a simple reduction second speed drive, the torque converter being effective in first speed drive and ineffective in second speed drive.

13. In a vehicle speed transmission as defined in claim 11, a brake for said second sun gear operable in combination with said first clutch to provide an overdrive ratio at which said converter is ineffective.

14. In a variable speed transmission as defined in claim 11, a brake for said first sun gear and the interconnected second carrier operable in combination with said second clutch to provide a reverse ratio at which said converter is effective.

References Cited in the file of this patent

UNITED STATES PATENTS

| | | |
|---|---|---|
| 2,302,714 | Pollard | Nov. 24, 1942 |
| 2,813,437 | Kelbel et al. | Nov. 19, 1957 |
| 2,860,526 | Dodge | Nov. 18, 1958 |

FOREIGN PATENTS

| | | |
|---|---|---|
| 642,054 | Great Britain | Aug. 23, 1950 |